United States Patent
Bradley et al.

(10) Patent No.: US 6,315,181 B1
(45) Date of Patent: Nov. 13, 2001

(54) LADDER RACK APPARATUS AND METHOD

(75) Inventors: John A. Bradley, Milwaukee; Jeffrey A. Wierschke, Sheboygan Falls, both of WI (US)

(73) Assignee: Adrian Steel Company, Adrian, MI (US)

( * ) Notice: Subject to any disclaimer, the term of this patent is extended or adjusted under 35 U.S.C. 154(b) by 0 days.

(21) Appl. No.: 09/549,021

(22) Filed: Apr. 14, 2000

(51) Int. Cl.$^7$ .................................................. B60R 9/042
(52) U.S. Cl. ......................... 224/310; 414/462; 414/546
(58) Field of Search .................................... 224/310, 315, 224/324; 414/462, 546

(56) References Cited

U.S. PATENT DOCUMENTS

| | | |
|---|---|---|
| 3,058,607 | 10/1962 | Kiley . |
| 3,963,136 | 6/1976 | Spanke . |
| 4,808,056 | 2/1989 | Oshima . |
| 5,058,791 | 10/1991 | Henriquez et al. . |
| 5,297,912 | 3/1994 | Levi . |
| 5,398,778 * | 3/1995 | Sexton ................................. 182/127 |
| 5,850,891 | 12/1998 | Olms et al. . |
| 6,092,972 * | 7/2000 | Levi ..................................... 414/462 |
| 6,179,543 * | 1/2001 | Adame et al. ......................... 414/462 |

\* cited by examiner

Primary Examiner—Stephen K. Cronin
(74) Attorney, Agent, or Firm—Michael Best and Friedrich LLP

(57) ABSTRACT

A ladder rack providing for easier loading, unloading, and storage of a ladder. The ladder rack preferably has a pivot and a carriage mounted upon one or more arms attached to the pivot. A ladder is placed upon the carriage which can then be rotated via the pivot and arms (and preferably using a ratchet assembly) from a loading and unloading position to a stowage position separated by an obtuse angle. In some preferred vehicular applications, the unloading and loading position is beside the vehicle while the stowage position is over or above the vehicle. Also preferably, the carriage substantially overlies the ladder when in the stowage position, thereby providing for immediate and effective security against ladder theft as well as a compact ladder storage arrangement. Preferred embodiments of the present invention also employ a carriage that is slidable along the arms. This carriage has a rung grip which is separated a distance along the ladder rack from an opposed rung grip. When a ladder is mounted upon the rung grips, the grips are located adjacent respective rungs on the ladder. By sliding the carriage and ladder along the arms toward a retracted position, the distance between the rung grips shorten, thereby gripping and holding the ladder by compressing rungs of the ladder between the rung grips. One or more springs can be used to control movement of the pivot, carriage, and ladder, if desired.

54 Claims, 7 Drawing Sheets

LADDER RACK APPARATUS AND METHOD

FIELD OF THE INVENTION

The present invention relates to ladder racks, and more particularly to movable ladder racks that increases user access during ladder loading and unloading.

BACKGROUND OF THE INVENTION

Numerous devices exist for storing and securing ladders, whether for stationary applications or for ladder transport. In each device, a number of problems unique to storing and securing ladders are addressed with varying success. For example, because most ladders are bulky and long, the ability to store ladders in many environments (such as upon a vehicle) is often limited. As another example, the large size and heavy weight of many ladders can make ladder lifting, manipulation, and other movement during storage a difficult process. Several ladder rack designs employ features directed to address these problems, but at the expense of ladder racks that are often fairly complex, expensive, and bulky. Also, by the nature of their design and operation, many conventional ladder racks do not readily protect against ladder theft.

Although the problems just described are common to ladder storage and securing devices (hereinafter referred to as "ladder racks") in any environment, vehicular applications are particularly problematic. Most conventional vehicle ladder racks require the user to lift the ladder some distance to place the ladder in the rack. Especially where heavy or long ladders are to be loaded or where only one person is available for ladder loading, this process can be rather difficult. Some conventional vehicle ladder racks also require manipulation of the ladder rack in one or more ways to position the ladder after it has been loaded in the rack. This is often necessary where the desired ladder storage position is on top of the vehicle or otherwise in a high position on the vehicle. Because such ladder movement commonly requires accompanying movement of at least part of the ladder rack in some way, the weight for a user to move in positioning the ladder can be significant. The devices sometimes used to aid in moving this weight can add a large amount of complexity and expense to the ladder rack. Also, the mechanical advantage provided by these devices is often much less than optimal.

In light of the problems and limitations of the prior art described above, a need exists for a ladder rack that can be used in both stationary and vehicular applications, is compact and easy to use, provides for easy ladder loading, unloading, and rack access, is relatively inexpensive to manufacture and assemble, offers protection against ladder theft, and can be easily manipulated to move a ladder between ladder stowage and ladder loading and unloading positions. Each preferred embodiment of the present invention achieves one or more of these results.

SUMMARY OF THE INVENTION

The present invention is a ladder rack providing for easy loading, unloading, and storage of a ladder in the rack. The ladder rack preferably has a pivot and a carriage mounted upon one or more arms attached to the pivot. A ladder is placed upon the carriage which can then be rotated via the pivot and arms from a loading and unloading position to a stowage position. In a number of highly preferred embodiments of the present invention (such as where the ladder rack is mounted upon a vehicle), the loading and unloading position is separated from the stowage position by an obtuse angle. For example, in a preferred vehicular application, the stowage position of the carriage and ladder is located substantially above or on top of the vehicle while the loading and unloading position of the carriage and ladder is located beside a vehicle and at a relatively steep angle with respect to a horizontal plane. In this embodiment, the loading and unloading position and the stowage position of the carriage and arms are most preferably separated by between 200 and 270 degrees, but can be separated by a smaller (most preferably still obtuse) angle. Also in this embodiment, the carriage of the ladder rack preferably substantially overlies the ladder when in the stowage position, thereby providing for immediate and effective security against ladder theft as well as a compact ladder storage arrangement.

Some preferred embodiments of the present invention also employ a carriage that is slidable along the arms between a retracted position and an extended position. This carriage has a rung grip thereon separated a distance along the ladder rack from an opposed rung grip. Like the carriage rung grip, the opposed rung grip is preferably rotatable with the pivot. When a ladder is mounted upon the carriage rung grip and the opposed rung grip, the grips are located adjacent to respective rungs on the ladder. Either or both of these rung grips can be made adjustable to position the rung grips adjacent to ladder rungs when the ladder is loaded upon the ladder rack. By sliding the carriage and ladder along the arms toward a retracted position, the distance between the rung grips shorten, thereby gripping the ladder by compressing rungs of the ladder between the rung grips. The carriage and ladder can be moved in this manner until a desired amount of compression is attained, at which time a carriage positioning mechanism can preferably be manipulated to hold the carriage and ladder in place on the arms.

Although substantially straight translation of the carriage along the arms is employed in some highly preferred embodiments of the present invention, other types of carriage movement causing the distance between the rung grips to shorten (e.g., bringing the carriage rung grip closer to the opposed rung grip when the carriage is moved in one direction) are possible. For example, the arms upon which the carriage is mounted can be oriented in any manner so that the carriage translates therealong to move the carriage rung grip with respect to the opposed rung grip and to change the distance between the rung grips. Movement of the carriage upon the arms can be substantially straight or can be curved in any manner desired causing this distance to change. In this regard, alternatives to the preferred arms and carriage elements can be used to change the distance between the rung grips. For example, the carriage and arms can be replaced by a pivotable member upon which a rung grip (corresponding to the carriage rung grip described above) is mounted or from which the rung grip extends. When pivoted, the pivotal member swings this rung grip toward or away from the opposed rung grip to thereby change the distance between the rung grips for engaging the ladder. Other alternative structures and elements to the highly preferred carriage and arms are also possible.

The carriage positioning mechanism preferably has an engagement element releasably engagable with one of the arms upon which the carriage slides. More preferably, the engagement element is a pin that can be selectively engaged in any of a number of apertures or detents to prevent movement of the carriage (and ladder therein) with respect to the arms.

After the ladder has been engaged by the rung grips as described above, the user can preferably rotate the ladder and carriage about the pivot toward the stowage position. This rotation is preferably accomplished by a user-manipulatable lever connected to the pivot via a ratchet assembly. The lever and ratchet assembly provide mechanical advantage to a user for rotating the ladder and carriage, and preferably permit user disengagement of the ratchet to rotate the ladder and carriage in a reverse direction when desired.

One or more springs can be used to control movement of the pivot, carriage, and ladder. For example, a gas spring is preferably attached to and between the carriage and one of the arms to provide a bias force retracting the carriage along the arms. This helps a user slide the carriage and ladder to a retracted and ladder-engaged position. As another example, a gas spring is preferably attached to and between a frame upon which the ladder rack is mounted and the pivot to help control rotation of the pivot, carriage, and ladder (such as to prevent rapid rotation of these elements under the force of gravity).

More information and a better understanding of the present invention can be achieved by reference to the following drawings and detailed description.

BRIEF DESCRIPTION OF THE DRAWINGS

The present invention is further described with reference to the accompanying drawings, which show preferred embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts.

DETAILED DESCRIPTION OF THE PREFERRED EMBODIMENTS

Figure 1:
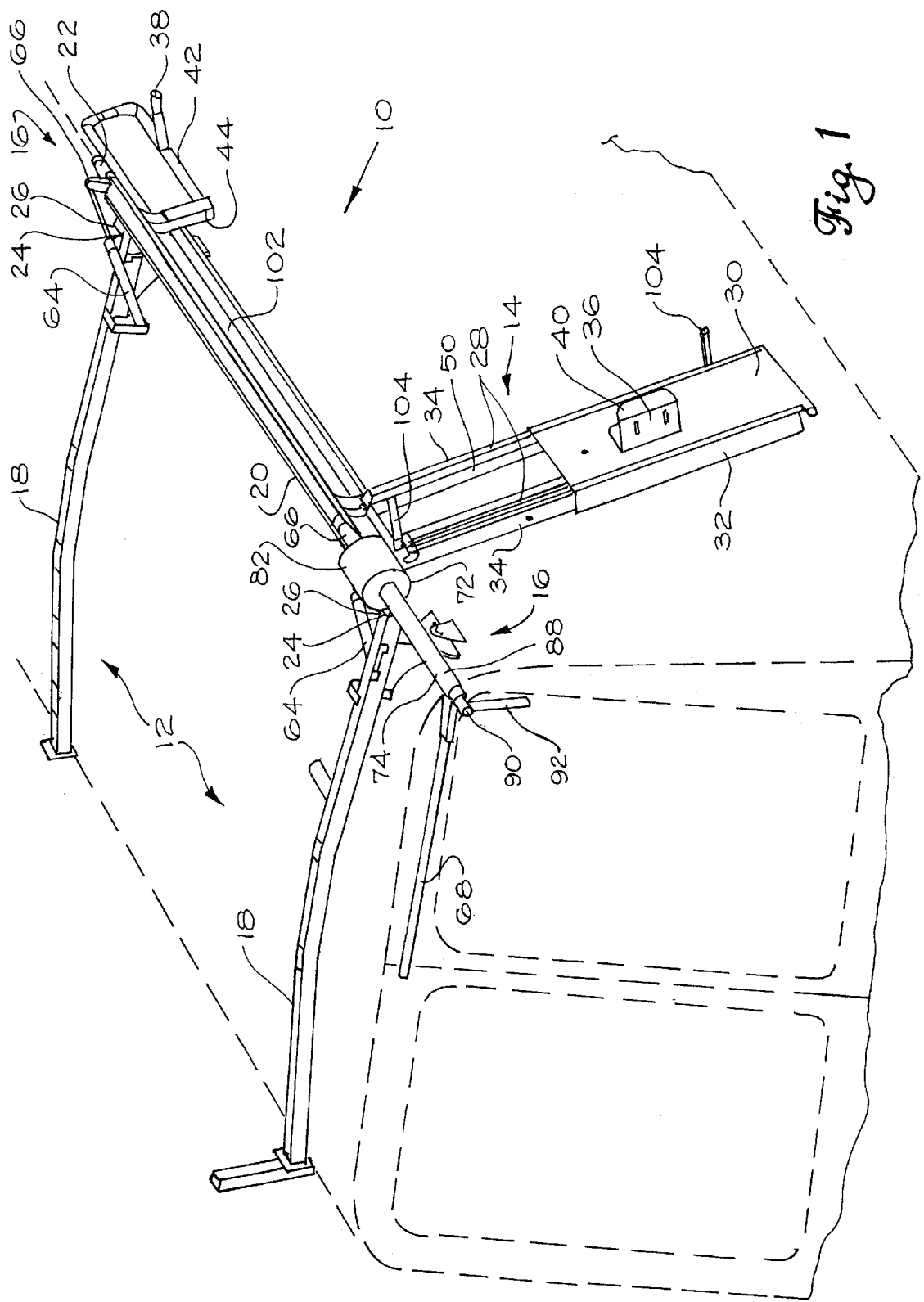
FIG. 1 is a perspective view of a ladder rack according to a first preferred embodiment of the present invention, shown mounted upon a vehicle with the ladder rack in an open and released position.

The ladder rack of the present invention can be used in any application or environment, but has particular advantages when used on a vehicle. Accordingly, although the rack in the accompanying figures and described hereinafter is for a vehicular application, it should be noted that this application is presented by way of example only, and does not indicate or imply that the present invention is limited to vehicular applications. Similarly, the ladder rack of the present invention is illustrated and described for use on a van, but can instead be used on any other type of vehicle desired.

The ladder rack of the present invention (indicated generally at 10 in FIGS. 1–7 of the illustrated preferred embodiment) preferably has a frame assembly 12, a carriage assembly 14, and a rotating assembly 16. With reference first to FIGS. 1–5, the frame assembly 12 provides a support and mounting structure for the carriage assembly 14 and the rotating assembly 16. In the preferred embodiment shown, the frame assembly 12 has a pair of beams 18 extending across the roof of the vehicle. The beams 18 preferably have a shape that generally conforms to the shape of the vehicle, are mounted upon the vehicle in a conventional manner, and preferably are located a clearance distance from the vehicle body. Although two frame beams 18 are preferred for a number of vehicular applications such as the one shown in the figures, any number of frame beams can be mounted upon various portions of any given vehicle. Such mounting arrangements depend at least partially upon the type of vehicle used (e.g., pick-up truck, flatbed truck, stationwagon, fire truck, etc.), but all preferably share in common one or more mounting locations for the remainder of the rack assembly 10 as will be described below. Frame beams and their manner of attachment are well known to those skilled in the art and are not therefore described further herein.

Figure 2:
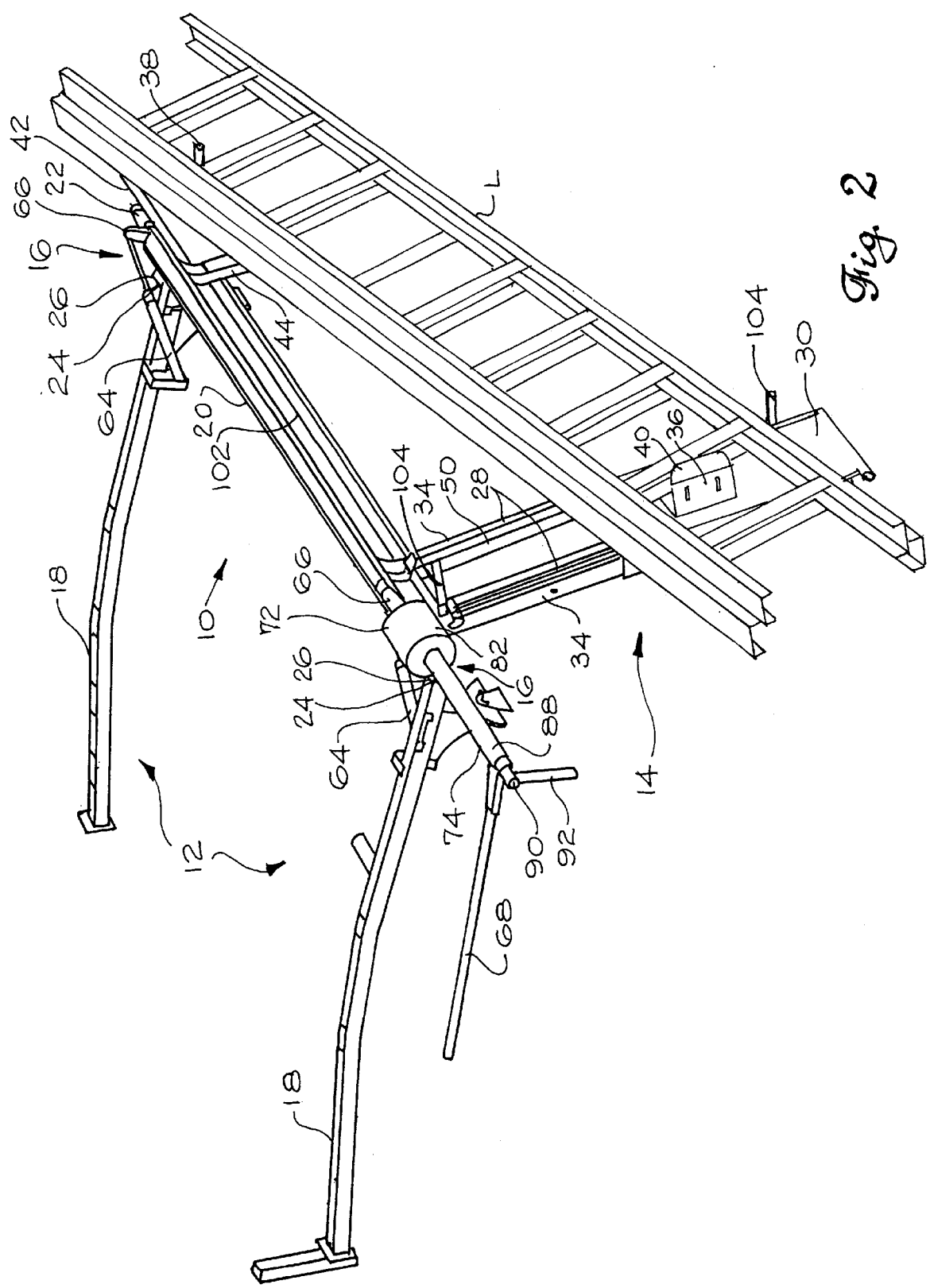
FIG. 2 is a perspective view of a ladder rack illustrated in FIG. 1, shown with a ladder placed in the rack.
Figure 3:
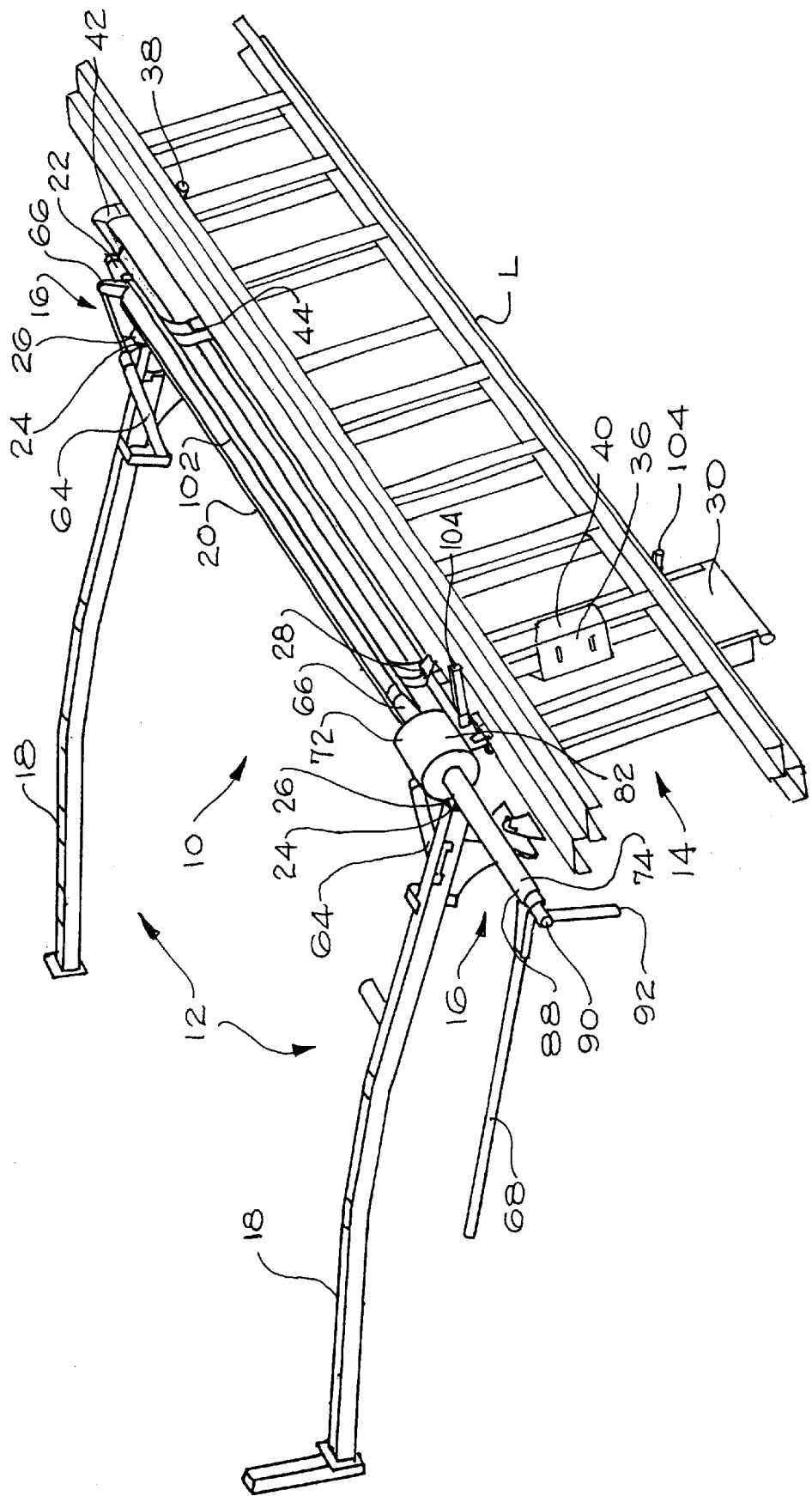
FIG. 3 is a perspective view of a ladder rack illustrated in FIGS. 1 and 2, shown with the ladder rack in an open and engaged position.
Figure 4:
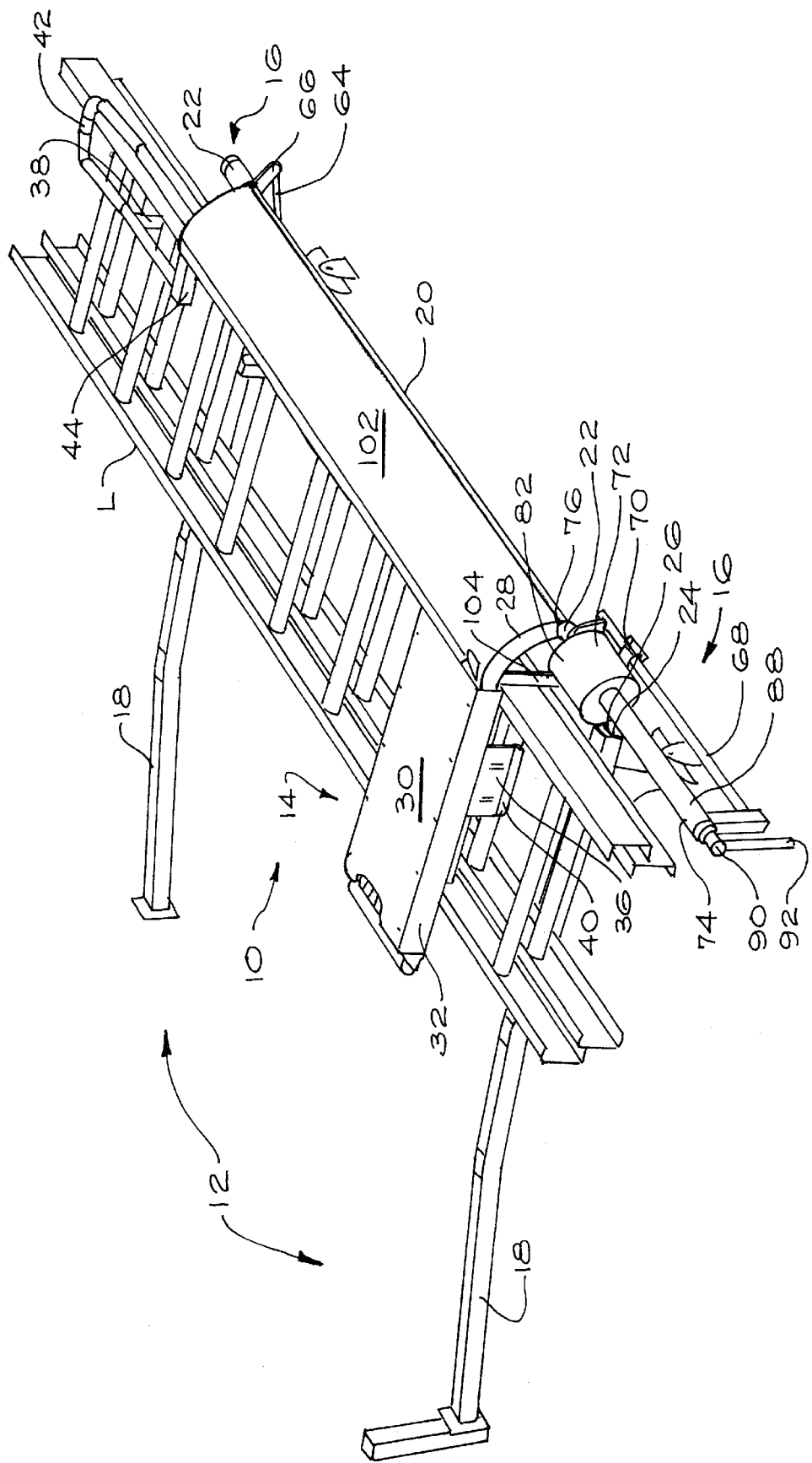
FIG. 4 is a perspective view of a ladder rack illustrated in FIGS. 1–3, shown with the ladder rack in a closed and engaged position.

The rotating assembly 16 enables the carriage assembly 14 to be rotated about an axis to and from a loading and unloading position shown in FIGS. 1–3 and a stowage position shown in FIGS. 4–7. To accomplish this function, the rotating assembly 16 preferably has a pivot 20 to which the carriage assembly 14 is attached. Preferably, the pivot 20 is mounted for rotation within bushings 22 connected to the beams 18 of the frame assembly 12 at mounting locations 24. Specifically, each mounting location 24 preferably has a mounting plate or other conventional attachment point to which the bushings 22 can be connected. In the illustrated preferred embodiment, the mounting locations 24 are defined by flanged ends 26 (see for example FIGS. 6 and 7) of the frame assembly beams 18, each flanged end 26 having a series of fastener holes through which conventional fasteners can be passed. These fastener holes match with fastener holes in the bushing 22. Although this manner of connection is preferred, it should be noted that bushings for the pivot 20 can be attached to the frame assembly 12 in a number of other manners, including without limitation by welding, brazing, or gluing the bushings 22 to the frame assembly 12, screwing threaded ends of the bushings 22 into or upon threaded ends of the beams 18, press fitting the bushings 22 into or upon ends of the beams 18, etc. In other embodiments of the present invention, the bushings 22 can even be integral with or otherwise part of the frame assembly 12 or can be mounted directly to the vehicle in any conventional manner (in which case it is possible to eliminate the use of a frame assembly 12).

The pivot 20 is preferably an elongated tubular member rotatably received within respective bushings 22. The pivot 20 can be tubular or solid and can be a single element or defined by multiple elements connected to pivot together. It should be noted that the pivot 20 can be mounted for rotational movement in any manner desired. For example, the pivot 20 can be a tubular member within which is received a coaxial post or pin secured at another end to the frame assembly 12 or directly to the vehicle. Alternatively, the pivot 20 can be received within one or more bosses of or on the vehicle body. Such other rotational mounting arrangements are conventional in nature and are within the spirit and scope of the present invention.

The carriage assembly 14 has at least one arm 28 upon which is mounted a carriage 30. More preferably, the carriage assembly 14 has a pair of arms 28 as shown in the figures for increased carriage stability and strength. The arms 28 are preferably substantially parallel and connected to the pivot 20 in any conventional manner, including without limitation by welding, brazing, gluing, conventional fasteners, and the like. The arms 28 are shaped to slidably receive the carriage 30. In this regard, the arms 28 can have any cross sectional shape and can be solid or tubular, but preferably are either square or round tubular members. The carriage 30 is preferably a plate-shaped member having turned edges 32 (or edges that are otherwise shaped to fit at least partially around the arms 28). Although a substantially planar carriage 30 slidably mounted upon a pair of arms 28 is preferred, it will be appreciated that a number of other carriage assembly arrangements can be used. The arms 28 of the present invention can take several alternative forms capable of performing the same functions of the arms 28 described above. The arms 28 can be defined by one, two, or more structural members connected for rotation with the pivot 20 in any conventional manner such as those described above. These structural members include without limitation plates, tubes, rods, bars, or any combination thereof. For example, the two arms 28 of the preferred embodiment can be replaced by a single rod upon which is mounted the carriage 30. Alternatively, the two arms 28 can be replaced by a plate or other substantially planar member. As used herein and in the appended claims, the term "arm" refers to an arm of the preferred embodiment described above and illustrated in the figures as well as to such other structures.

The carriage 30 of the present invention can also take a number of other forms capable of providing structural support for a ladder (in a manner as described below) and preferably of translational movement with respect to the arms 28. The carriage 30 can be defined by one or more plates, tubes, rods, bars, or any combination thereof preferably assembled as an integral structure mounted upon the arms 28. One having ordinary skill in the art will appreciate that any carriage design used can be mounted upon the arms 28 for translation therealong in a number of different manners. The carriage 30 can have edges 32 that are curved, bent, or otherwise shaped to fit at least partially around the arms 28 such as in the illustrated preferred embodiment. Alternatively, the carriage 30 can have one or more rings, loops, or hooks attached thereto and shaped to fit around the arms 28 for translational movement therealong. The carriage 30 can instead have a longitudinal groove mating with a rail, one or more pins, or a tongue on the arms 28 for translational movement therealong. Such structure can be reversed to provide a groove in each arm 28 and one or more rails, pins, or tongues on the carriage 30. The carriage 30 can instead be mounted for translational movement upon the arms 28 by one or more sets of telescoping members, such as tubes or lugs mounted in any conventional manner to the carriage 30 and axially mating with tubes or posts connected to the arms in any conventional manner. This arrangement can also be reversed to provide a tube or lug on each arm 28 mating with a carriage tube or post axially received therein. The arms 28 themselves can even be shaped to telescopingly mate with a tube or post on the carriage 30 (or with the carriage 30 itself if the carriage 30 or part thereof defines such a mating member). For example, the carriage 30 and arms 28 can be telescoping tubes, if desired. In yet another alternative embodiment, a roller or ball bearing track can be attached in any conventional manner to and between the arms 28 and the carriage 30 to permit translational movement of the carriage 30 upon the arms 28. Still other elements and manners exist for enabling translational movement of the carriage 30 along at least a portion of the arms 28, each being well known to those skilled in the art and falling within the spirit and scope of the present invention. It should be noted that the terms "translation" and "slide" are used interchangeably herein and in the appended claims and include all manners of relative translation between the carriage and the arms 28, including without limitation sliding, rolling and gliding.

To help provide smoother translation of the carriage 30 upon the arms 28, bearing elements 34 can be located between the mating surfaces of the carriage 30 and the arms 28. The bearing elements 34 are preferably made of plastic, urethane, nylon, Teflon®, or other low wear material permitting smooth translational movement between the arms 28 and the carriage 30, but can instead be made from any other material desired. The bearing elements 34 are preferably strips of such material attached to outer surfaces of the arms 28, and more preferably are shaped to fit at least partially around the arms 28. Bearing elements 34 can be attached to the arms 28, the carriage 30, or to both the arms 28 and carriage 30, and can be attached thereto in any conventional manner (such as by adhesive, conventional fasteners, snap fitting to or upon the arms 28 and/or carriage 30, and the like). Although the bearing elements 34 are preferably elongated in shape as shown in the figures, the bearing elements 34 can take the form of bumps, ribs, pads, blocks, and the like covering any portion or all of the mating surfaces on the arms 28 and the carriage 30. For example, where the carriage 30 is a plate slidable upon the arms 28 via bearing slides, the bearing elements 34 can be elongated beads running along the arms 28 adjacent to the slides or near the edges of the carriage 30. As another example, where one tubular arm telescopes within or upon a tubular carriage, one or more ring-shaped bearing elements can be fitted between the tubes and can be attached to the interior of the outside tube or the exterior of the inside tube in any conventional manner. Other bearing element shapes and locations will be recognized by one having ordinary skill in the art, and depend at least in part upon the shapes of the arms 28 and carriage 30 and their manner of attachment to one another.

To hold a ladder in the rack 10 of the present invention, a pair of rung grips 36, 38 are preferably employed to exert a compressive force upon adjacent respective rungs of the ladder in the rack 10. Rather than hold a ladder by gripping its rails, these grips 36, 38 exert a holding force that is substantially parallel to the ladder. One rung grip 36 is attached to the carriage 30 while the other rung grip 38 is located a distance therefrom down the ladder rack 10. The rung grip 36 on the carriage 30 is preferably an L-shaped member secured to a surface of the carriage 30 by threaded fasteners. Although an L-shaped carriage rung grip 36 is preferred, the carriage rung grip 36 can take a number of other forms, such as a wall or rail secured to the surface of the carriage 30, one or more posts or fingers attached to or otherwise extending from the surface of the carriage 30, a U or V-shaped element shaped to receive a rung of the ladder therein, etc. If desired, the carriage rung grip 36 is user-adjustable via slotted holes in the carriage rung grip 36 and/or in the carriage 30. Other manners of making the carriage rung grip 36 user adjustable are well known to those skilled in the art, including without limitation mounting the carriage rung grip 36 upon a rail or track on the carriage 30 (the rung grip 36 being securable in a range of locations on the rail or track via one or more setscrews, conventional fasteners, clamps, and the like), employing multiple fastener holes or locations at which the carriage rung grip 36 can be secured on the carriage 30, etc. Still other manners of rung grip attachment are possible if the carriage rung grip 36 is not made user-adjustable. Such other attachment manners include using adhesive or cohesive, welding, brazing, using other conventional fasteners such as rivets or nails, and the like. The carriage rung grip 36 can even be made integral to the carriage 30 if desired.

To improve the ability of the carriage rung grip 36 to hold a rung of the ladder in the rack 10, the rung grip 36 preferably has a grip pad 40 attached thereto via threaded fasteners. The grip pad 40 is preferably made from a resilient deformable material such as rubber or urethane pieces or foam. Alternatively, the grip pad 40 can be made of any other material preferably capable of deforming to some degree under compression against a ladder rung. The grip pad 40 can also be textured, ribbed, dimpled, grooved, curved, or otherwise shaped to prevent rung slippage with respect to the grip pad 40. It should be noted that the grip pad 40 can be attached to the rung grip 36 in any conventional manner, such as by those described above with reference to the attachment between the rung grip 36 and the carriage 30. The grip pad 40 can instead be defined by a layer of material sprayed or otherwise coated upon the carriage rung grip 36. Also, the position of the grip pad 40 upon the carriage rung grip 36 can be made adjustable in any manner described above with reference to rung grip adjustability, and is preferably adjustable via slotted fastener holes in the rung grip 36 and/or the grip pad 40.

The opposing rung grip 38 is located on the ladder rack 10 a distance from the carriage rung grip 36. Most preferably, this opposing rung grip 38 is at an opposite end of the ladder rack 10 as shown in the figures. Like the carriage rung grip 36, the opposing rung grip 38 is preferably mounted for rotation with the pivot 20. Preferably, the opposing rung grip 38 is attached to a grip extension 42, which is itself attached to the pivot 20 via a second arm 44 as shown in the figures. The second arm 44 is preferably a tubular member attached to the pivot 20 in any conventional manner (such as by welding). However, the second arm 44 can take any form and be connected to the pivot 20 in any manner such as those described above with reference to the arms 28 of the carriage assembly 14. Preferably, the second arm 44 is somewhat shorter than the arms 28 of the carriage assembly 14, and is substantially parallel thereto.

Although the opposing rung grip 38 can be attached directly to the second arm 44 in any conventional manner, the grip extension 42 provides a simple manner by which the opposing rung grip 38 can be located in a desired position with respect to the carriage rung grip 36, and provides a degree of protection against ladder contact with the vehicle during ladder loading and unloading. The grip extension 42 is preferably a tube or rod connected to the second arm 44 and rotatable therewith upon rotation of the pivot 20. In some highly preferred embodiments of the present invention, the grip extension 42 is a U-shaped tube or rod attached at both ends to the second arm 44 as shown in the figures. This grip extension structure is preferred due to its relatively light weight and simple construction. However, any member or framework preferably extending from the second arm (such as a plate, arm, or other preferably elongated structure) can instead be used.

The grip extension 42 can be attached to the second arm 44 by welding, brazing, one or more threaded fasteners, gluing, or in any other conventional manner. The grip extension 42 can also be made adjustable with respect to the second arm 44. The manner of adjustment is determined at least partially by the structure and shape of the grip extension 42. Where a tubular or bar-shaped grip extension 42 is used, one or more ends of the grip extension 42 can be slidably received within mating apertures in the second arm 44. The grip extension 42 can be secured in many ways to different locations with respect to the second arm 44, such as by one or more setscrews, clamps, threaded fasteners, pins, or posts passed through apertures (threaded or otherwise) in the second arm 44 and abutting against the grip extension 42, received within recesses in the grip extension 42, or received within apertures in the grip extension 42. In other embodiments, the grip extension 42 can have a series of apertures along a length thereof within which a spring-loaded pin, ball bearing, or plug on the second arm 44 can be releasably received to hold the grip extension 42 in different positions relative to the second arm 44. Any conventional device or assembly capable of releasably securing one member slidable within and with respect to another can be used as desired and falls within the spirit and scope of the present invention. Alternatively, where the adjustable grip extension 42 is not slidably received within or through a portion of the second arm 44, the grip extension 42 can be attached in different relative positions upon the second arm 44 in a number of conventional manners, such as by multiple fastener holes in the second arm and/or in the grip extension 42, etc.

The opposing rung grip 38 is positioned to engage a rung of a ladder placed within the rack 10, and is preferably secured to the grip extension 42 by being welded thereto. Preferably, the opposing rung grip 38 is a post or tube that is attached to the grip extension 42 in any conventional manner (e.g., by one or more fasteners, adhesive, and the like, but most preferably by welding) or that is part of the grip extension 42. To improve engagement of the second rung grip 38 with a rung of a ladder in the rack 10, the second rung grip 38 is preferably curved, bent, or otherwise shaped to at least partially receive the rung. The second rung grip 38 can take any form and be connected in any of the manners described above with reference to the carriage rung grip 36, can be the same or similar to the carriage rung grip 36, and can even be mounted for adjustability upon the grip extension 42 as also described above with reference to the carriage rung grip 36. For example, the second rung grip 38 can be a plate, series of fingers, or even a portion of the grip extension 42 that is curved, bent, or otherwise shaped to provide a surface against which a ladder rung can abut and be held.

Although the second rung grip 36 is preferably located on a grip extension 42 as is shown in the figures, it should be noted that the second rung grip 38 can be located directly on the second arm 44 or even upon the pivot 20 and can be connected in these other locations in any of the manners described above. Also, the second rung grip 38 can be adjustably connected to the second arm 44 or to the pivot 20 in any of the manners described above, if desired.

The ladder rack 10 preferably has a number of motion control features as will now be described. Although each of these features is optional to the present invention, these features provide a user with improved control over the location and movement of the ladder rack 10, and therefore of a ladder placed therein.

Figure 6:
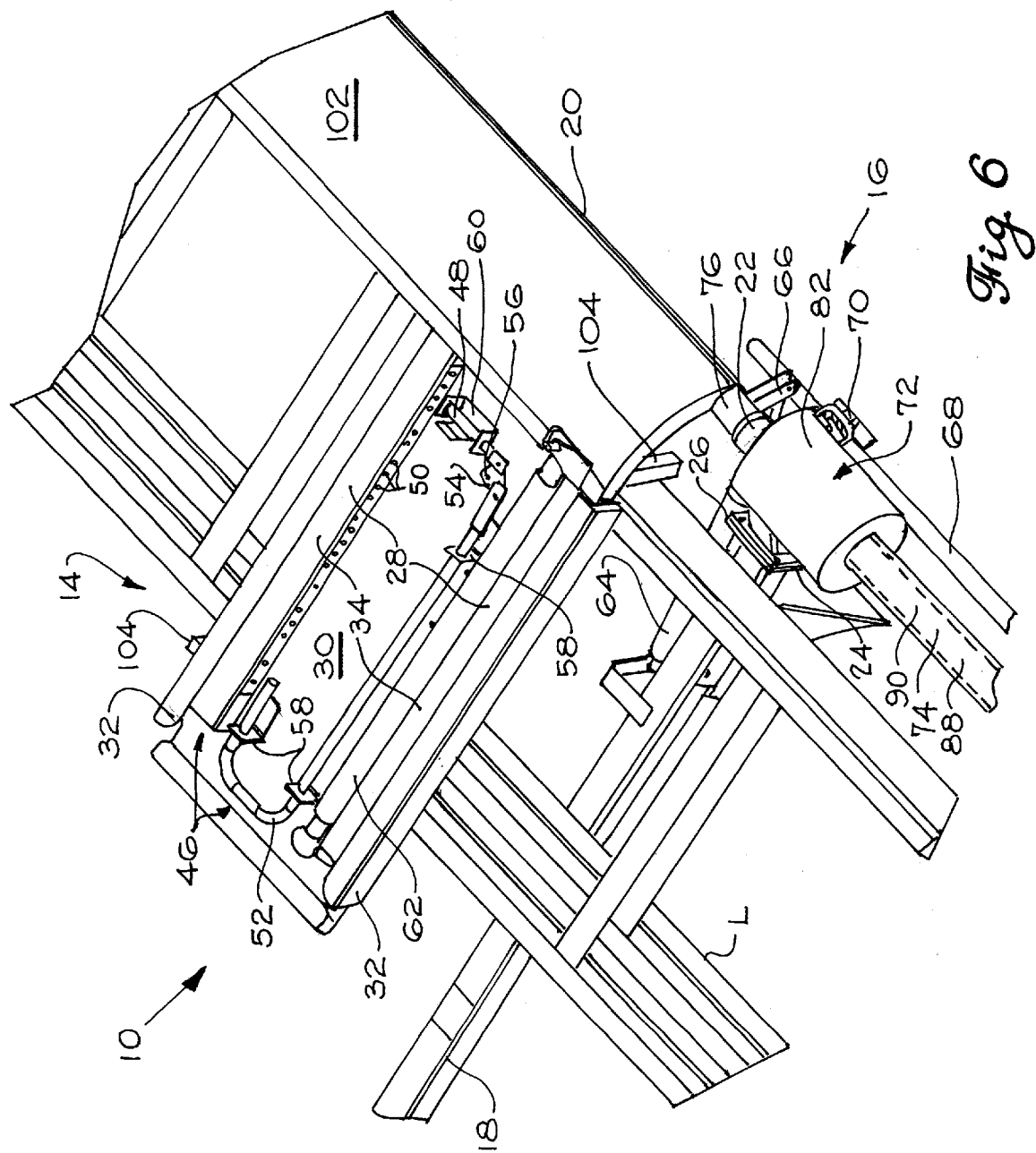
FIG. 6 is a detail view of the ladder rack carriage and release mechanism shown in the ladder rack of FIGS. 1–5, with the ladder rack in a closed and engaged position and with a ladder therein.

To help control the position of the carriage 30 upon the arms 28 of the ladder rack 10, a carriage positioning mechanism 46 is preferably attached to the carriage 30 and to the arms 28. To prevent unintentional movement (e.g., falling) of a ladder in the ladder rack 10 to the fully extended position shown in FIGS. 1 and 2, the carriage positioning mechanism 46 preferably employs a user-releasable pin and rack assembly. Specifically, and with reference to FIG. 6, a pin 48 connected to the carriage 30 is preferably releasably engagable within a number of different detents or apertures 50 in one of the arms 28 of the carriage assembly 14. The pin 48 is preferably spring-loaded for engagement with the detents or apertures 50. To release the pin 48 from engagement with the arm 28, a user-manipulatable handle 52 preferably extends from a user-accessible location (preferably adjacent to an edge of the carriage 30) to a lever 54 pivotably connected in a conventional manner for rotation at one end to the handle 52 and at another end to the pin 48 as shown in FIG. 6. The lever 54 is preferably rotatable about a pivot 56 secured with respect to the carriage 30 in any conventional manner. One or more handle guides 58 can be attached to the carriage 30 for improved control over handle movement, if desired. Similarly, one or more pin guides 60 can be attached to the carriage 30 for controlled pin movement. These guides 58, 60 can be hooks, lugs, apertured tabs, bosses, extensions, or any other elements shaped and sized to slidably receive the handle 52 therein. The guides 58, 60 are preferably welded to the carriage 30, but can be attached thereto in any conventional manner (brazing, adhesive, conventional fasteners, clamps, and the like) or can even be part of the carriage 30 itself.

By pulling upon the handle 52 the lever 54 is preferably caused to rotate, which retracts the spring-loaded pin 48 from a detent or aperture 50 in the arm 28 and thereby releases the carriage 30 for translational movement along the arms 28. When the handle 52 is released, the spring-biased pin 48 is forced toward an adjacent detent or aperture 50 in the arm 28 and thereby engages with the arm 28 to hold the carriage 30 in a location upon the arms 28. If desired, the pin 48 can be shaped to retract from the detent or apertures 50 in the arm 28 when the carriage 30 is pushed (such as by having an inclined or wedge-shaped end that causes the pin 48 to retract when lateral force is exerted upon the pin 48 in the detents or apertures 50), but to remain extended when the carriage 30 is released.

Although the pin and rack assembly described above and illustrated in the figures is preferred, other pin and rack assembly designs can be used to selectively position the carriage 30 in a number of locations upon the arms 28. For example, the detents or apertures 50 can be located in any member that is secured against movement with the carriage 30, and need not necessarily be located in an arm 28 of the carriage assembly 14. Also, the pin 48 can be user-manipulatable in a number of other manners, such as by a pull directly attached to the pin 48 and accessible by a user for releasing and/or engaging the pin 48, a rotating handle coupled to the pin 48 and rotatable by a user to retract and/or extend the pin 48, etc. Still other pin and rack mechanisms performing the carriage positioning and holding functions described above will be recognized by one having ordinary skill in the art. Depending at least in part upon the type of carriage assembly employed, other carriage positioning mechanisms 46 can also be used. For example, a scissor jack mechanism can be attached at one end to the carriage 30 and at another to the arms 28 for extending and retracting the carriage 30 upon the arms 28. As another example, one or more hydraulic or pneumatic jacks or pistons can be mounted between the carriage 30 and the arms 28 for controllably translating the carriage 30 upon the arms 28.

One having ordinary skill in the art will appreciate that still other carriage positioning mechanisms can be used and fall within the spirit and scope of the present invention.

Highly preferred embodiments of the present invention also employ one or more springs or dampers for controlling ladder rack movement. For example, and with reference again to FIG. 6, a gas spring 62 is preferably connected in a conventional manner at one end to the carriage 30 and at another end to an arm 28 of the carriage assembly 14. The gas spring 62 biases the carriage 30 to its retracted position shown for example in FIG. 3. The gas spring 62 helps a user to move the carriage 30 to this retracted position and (if the ladder rack 10 is oriented as shown in the figures) helps prevent the carriage 30 from dropping to its extended position (see FIGS. 1 and 2) too rapidly. As another example, one or more dampers 64 are preferably connected at one end to the frame assembly 12 and at another end to the pivot 20 (preferably via lever arms 66 to provide mechanical advantage for the dampers 64 acting upon the pivot 20). These dampers 64 are conventional in nature (e.g., hydraulic, magnetic, and the like), and help prevent the carriage assembly 14 from rotating too rapidly when rotated about the pivot 20 to its loading and unloading position shown in FIGS. 1–3. It will be appreciated that the gas spring 62 and the dampers 64 can be connected in other locations on the rack 10 to control and dampen carriage assembly movement as described above. For example, the carriage gas spring 62 can be directly or indirectly attached to the carriage 30 at one end and to the arms 28, pivot 20, or frame assembly 12 at another end. Also for example, the carriage assembly gas spring(s) 62 can be attached to the frame assembly 12 at one end and to the pivot 20 or arms 28 at another end.

Gas springs, their manner of connection, and their operation are well known to those skilled in the art and are not therefore described further herein. Although a gas spring 62 is preferred for controlling and damping movement of the carriage 30 upon the arms 28 and rotation of the carriage assembly 14 about the pivot 20, other conventional devices and mechanisms can be used for accomplishing these same functions. By way of example only, the gas spring 62 can be replaced by one or more other types of springs, such as helical, torsion, extension, and compression springs. Such alternative motion control and damping devices are well known to those skilled in the art.

Figure 5:
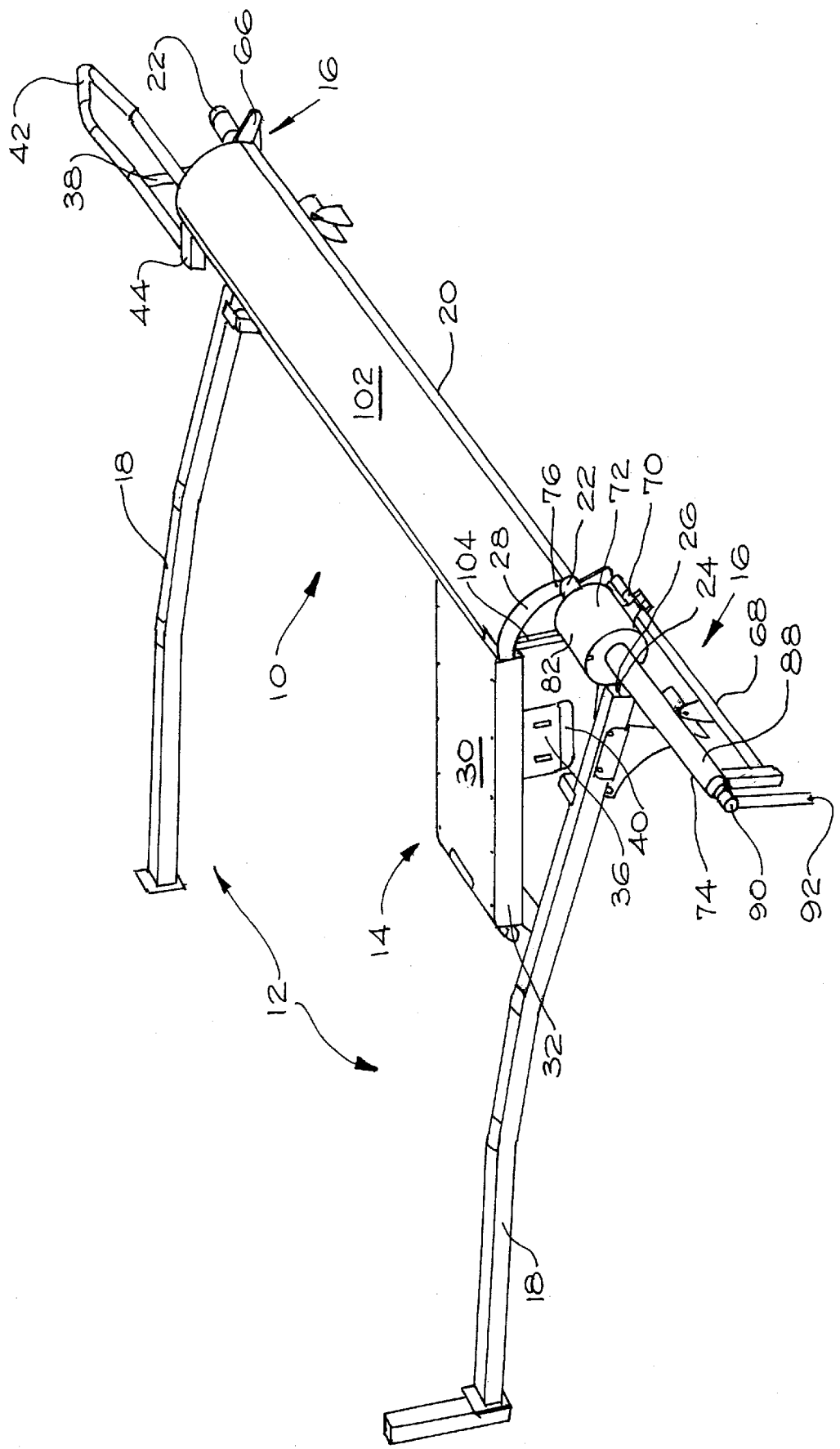
FIG. 5 is a perspective view of the ladder rack illustrated in FIGS. 1–4, shown with the ladder rack in a closed and engaged position and without a ladder therein.
Figure 7:
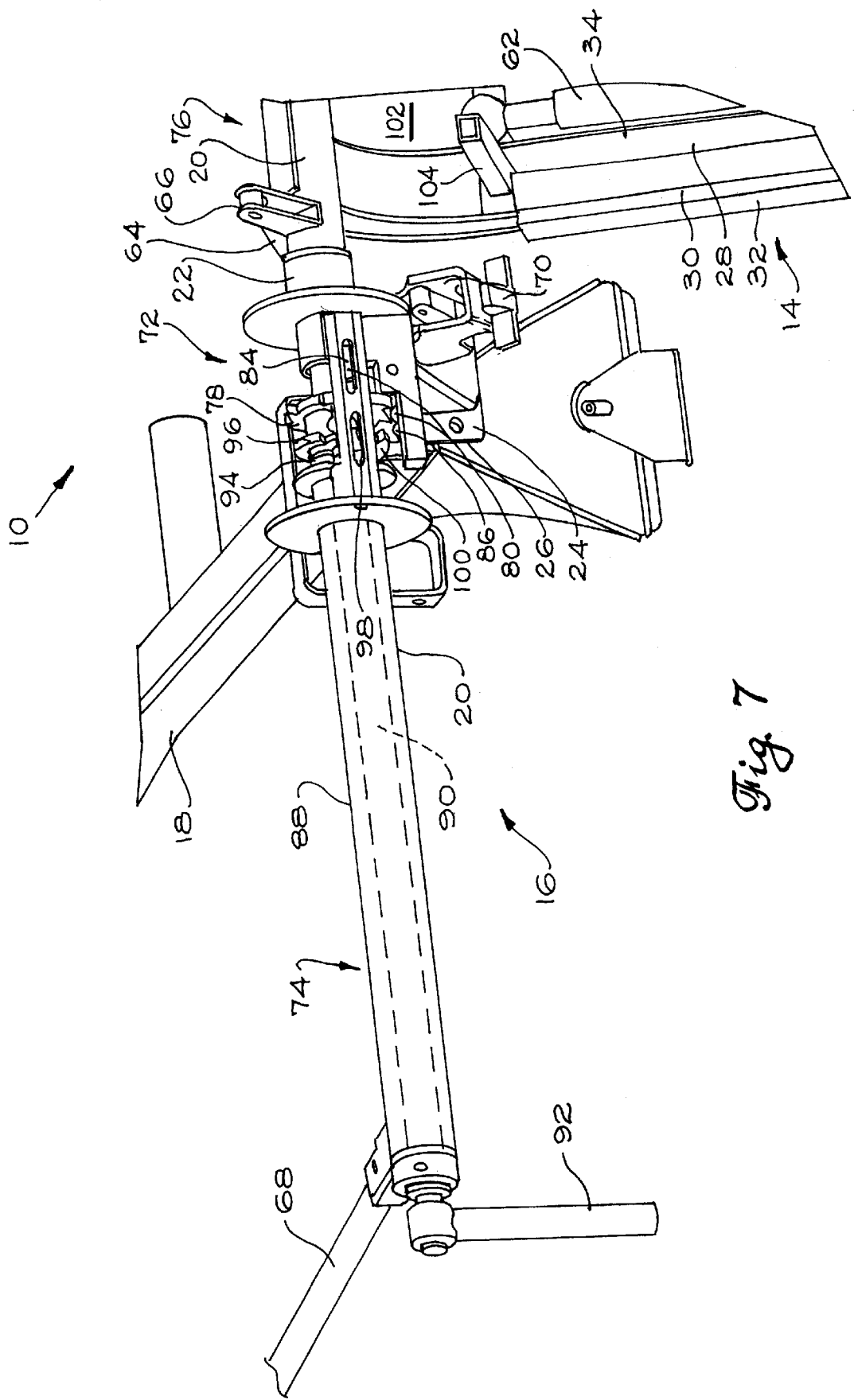
FIG. 7 is a detail view, partly sectioned, of the ladder rack rotating assembly shown in the ladder rack of FIGS. 1–6.

Another manner in which to control motion of the carriage assembly 14 is by controlled rotational motion of the pivot 20 to which the carriage assembly 14 is attached. The rotating assembly 16 is preferably used for this purpose, and can include a lever 68 attached to an end of the pivot 20 in any conventional manner. Preferably however, the lever 68 is pinned for rotation at an end of the pivot 20 so that the lever 68 can be folded or otherwise collapsed when not in use. This feature also permits the use of a conventional latch 70 attached to the frame assembly 12 or to the carriage assembly 14 and positioned to receive the lever 68 when folded or collapsed as is best shown in FIGS. 5–7. The latch 70 can be readily locked with a padlock or other securing device to prevent unauthorized operation of the ladder rack 10. Although the lever 68 alone can be used to rotate the pivot 20 and to thereby rotate the carriage assembly 14 about the pivot 20, a ratchet assembly 72 can be included to provide improved manipulation of the pivot 20 by the lever 68. With continued reference to FIGS. 6 and 7, highly preferred embodiments of the present invention employ a ratchet assembly 72 between a driving side 74 of the pivot 20 and a driven side 76 of the pivot 20. The ratchet assembly 72 preferably includes a ratchet 78 mounted upon the pivot 20 (for rotation therewith) in any conventional manner, and at least one pawl 80 mounted beside the ratchet 78 for engagement with the teeth of the ratchet 78 in a manner well known to those skilled in the art. Preferably, two pawls 80 are mounted for pivotal movement to a ratchet assembly housing 82, and are spring biased to engage the teeth of the ratchet 78. One pawl 84 is preferably mounted on a portion of the ratchet assembly housing 82 attached to and rotating with the driving side 74 of the pivot 20, while another pawl 86 is preferably mounted on a portion of the ratchet assembly housing 82 attached to a non-rotating part of the ladder rack 10 (such as to any portion of the frame assembly 12, bushing 22, and the like). The teeth of the ratchet 78 are preferably oriented to prevent rotation of the pivot 20 dropping the carriage assembly 14 to its loading and unloading position shown in FIGS. 1–3. Therefore, rotation of the driving side 74 of the pivot 20 causes rotation of the ratchet 78 via the pawl 84 rotating with the driving side 74 and thereby causes rotation of the driven side 76 of the pivot 20 to raise the carriage assembly 14 from its loading and unloading position. The other pawl 86 acts to hold the pivot's position 20 when the rotating force upon the driving side of the pivot 74 is removed.

Although the driving and driven sides 74, 76 of the pivot 20 can be a single shaft pivotable by the ladder rack lever 68 and to which the ratchet 78 is mounted, the driving side 74 of the pivot 20 more preferably has concentric members axially and rotatably movable with respect to one another for purposes that will be described below. The driving side 74 of the pivot 20 preferably has an outer tube 88 extending from the ratchet assembly 72 (and attached for rotation with that portion of the ratchet assembly 72 carrying the rotating pawl 84) to the ladder rack lever 68 to which it is attached. Preferably, an inner tube or shaft 90 is received within the outer tube 88 and is the rotating member to which the ratchet 78 is mounted. In such an embodiment, this inner tube or shaft 90 is attached to or integral with the driven side 76 of the pivot 20. As such, rotation of the outer tube 88 by a user causes the pawl 84 to rotate, thereby rotating the engaged ratchet 78 and the inner tube or shaft 90, which in turn rotates the driven side 76 of the pivot 20. A primary purpose of this arrangement is to enable release or disengagement of the ratchet 78 from its pawls 80. Specifically, by axially shifting the inner tube or shaft 90, the ratchet 78 mounted thereon shifts to engage or disengage with the pawls 80. When the ratchet 78 is disengaged from the pawls 80, the outer tube 88 can be rotated in a reverse direction to rotate the carriage assembly 14 back toward the loading and unloading position as will be described in more detail below. Preferably, a ratchet engagement handle 92 is preferably attached to the inner tube or shaft 90 in any conventional manner to permit a user to axially shift the ratchet 78 as just described.

A secondary ratchet 94 can also be mounted upon the pivot 20 to permit the carriage 30 to be moved from its stowage position shown in FIGS. 4–7. Like the ratchet 78 described above, this secondary ratchet 94 can have multiple teeth for gradually rotating the carriage 30 from its stowage position. However, where much of the carriage rotation is assisted by the force of gravity (such as in the illustrated application), a large number of teeth are less necessary to rotate the carriage 30 from its stowage position. In such cases, the secondary ratchet 94 preferably has only a small number of teeth (and most preferably only one 96 for moving the carriage 30 from its stowage position). The secondary ratchet 94 can use the pawls 80 of the ratchet 78 described above, and can be moved into and out of engagement therewith in the same manner as also described above. However, the secondary ratchet 94 more preferably has at least one of its own pawls 98 pivotably mounted adjacent thereto on the rotating side of the ratchet assembly housing 82 and preferably spring-loaded to engage the secondary ratchet 94 when aligned therewith.

If desired, at least one other tooth 100 on the secondary ratchet 94 can be provided for positioning the ladder rack lever 68 when the carriage assembly 14 is in its loading and unloading and/or stowage positions. As is best seen in FIG. 7, this tooth 100 is preferably oriented in a direction opposite the other tooth or teeth of the secondary ratchet 94 described above. When the secondary ratchet 94 is aligned with its pawl 98 as described above, rotation of the carriage assembly 14 and pivot 20 toward the stowage position causes engagement of the second tooth 100 with the pawl 98 and thereby causes rotation of the ladder rack lever 68. The ladder rack lever 68 eventually comes to rest in a position determined by the location of the second tooth 100 on the secondary ratchet 94. Most preferably, this location is clear of any rear doors or windows of the vehicle, such as in a substantially horizontal top position above a van or truck's rear door(s). However, different locations of the second tooth 100 on the secondary ratchet 94 can be selected to result in different resting positions of the ladder rack lever 68 for different applications and environments. In addition to positioning the ladder rack lever 68 as just described, the reverse tooth 100 on the secondary ratchet 94 also permits a user to slowly lower the carriage assembly 14 when urged to rotate by gravity to its loading and unloading position.

It should be noted that the reverse tooth or teeth of the secondary ratchet 94 can be located on the secondary ratchet 94 to result in a resting orientation of the ladder rack lever 68 in its loading and unloading position, in its stowage position, or in any other rotational position of the carriage assembly 14 and pivot 20. Also, the number and direction of the teeth on both ratchets 78, 94 can be significantly different than that of the illustrated preferred embodiment. Specifically, the ladder rack 10 of the present invention can be oriented in different manners or have different relative loading and unloading and stowage positions from that shown in the figures. Therefore, the effect of gravity upon the carriage assembly 14 and the amount of pivot and carriage assembly rotation between positions can be significantly different than that shown in the figures. Preferably, these factors at least partially determine the number and positions of the teeth on the ratchets used in alternative embodiments of the present invention.

One having ordinary skill in the art will appreciate that other types of ratchet assemblies can be used for controllably rotating the carriage assembly 14 between its loading and unloading position of FIGS. 1–3 and its stowage position of FIGS. 4–7. These alternative ratchet assemblies can generate ratchet release and engagement with respect to one or more pawls in a number of well-known manners. Any one of these alternative ratchet assemblies can be used in the present invention as desired.

It may be desirable to provide a surface of the ladder rack 10 upon which advertisements, company names, or other information can be displayed. For this purpose, a shroud 102 can be included on the rack assembly 10 and can run along any length thereof. Preferably, the shroud 102 radially extends from the pivot 20 some distance, and can be substantially flat, curved (such as is shown in the figures), faceted, or have any other shape desired.

In operation, a ladder L is loaded upon the ladder rack 10 in a loading and unloading position. In this position, the carriage 30 is extended at least some distance along the arms 28 from a position adjacent to the pivot 20. It should be noted that the loading and unloading position of the carriage 30 need not be at any particular location of the carriage 30 upon the arms 28, but is at least at a position some distance from its fully retracted position closest to the pivot 20. In the loading and unloading position shown in FIGS. 1 and 2, a user loads one portion of the ladder L upon the carriage 30 and carriage rung grip 36 and another portion of the ladder L upon the opposing rung grip 38. Preferably, the ends of the ladder L are placed over respective rung grips 36, 38. The rung grips 36, 38 in this position are spaced a distance apart sufficient for the ladder L to be placed thereover, with a rung adjacent to each rung grip 36, 38 located between the rung grips 36, 38. If necessary, the position of either or both rung grips 36, 38 can be adjusted (described in more detail above) to position nearest rungs of the ladder L adjacent to the rung grips 36, 38. After loading the ladder L upon the ladder rack 10, the user pushes upon the carriage 30 and/or upon the ladder L to move the carriage 30 along the arms 28 toward a retracted position. In this movement, the distance between the rung grips 36, 38 naturally shortens, thereby eventually causing the rung grips 36, 38 to contact their adjacent ladder rungs. Further movement of the carriage 30 toward a retracted position causes the rung grips 36, 38 to compress their adjacent ladder rungs, thereby gripping and holding the ladder L by squeezing the ladder rungs. Like the ladder loading and unloading position described above, the position at which the ladder L is gripped and held by the rung grips 36, 38 need not be any particular location of the carriage 30 upon the arms 28, but is at least in a retracted position relative to the loading and unloading position. Therefore, movement of the carriage 30 and ladder L along the arms 28 need not be along the full range of carriage movement on the arms 28, but can be some fraction thereof.

Preferably, the carriage positioning mechanism 46 can be used to hold the carriage 30 in its various positions when the ladder L is being moved along the arms 28. Where a pin 48 shaped to permit movement of the carriage 30 toward a retracted position without user disengagement is used (see above), the user need only push upon the carriage 30 and/or ladder L to retract the carriage 30 and to grip the ladder L by its rungs. Otherwise, the user preferably manipulates the handle 52 to release the pin 48 and to permit translation of the carriage 30 and ladder L upon the arms 28. When the rungs of the ladder L have been gripped between the rung grips 36, 38, the user can release the handle 52 of the carriage positioning mechanism 46, thereby causing engagement of the pin 48 in a detent or aperture 50 in the arm 28 to secure the carriage 30 in its retracted and engaged position on the arms 28. Biasing force exerted by the gas spring 62 of the carriage assembly 14 preferably assists in retracting the carriage 30 along the arms 28.

Where other carriage positioning mechanisms are employed, the manner of gripping and holding the ladder L is preferably the same as that just described. Each alternative carriage positioning mechanism acts to move the carriage rung grip 36 to a position closer to the opposing rung grip 38 to squeeze rungs of the ladder L adjacent these rung grips 36, 38 when the ladder L is pushed in a retracting direction upon the arms 28.

After the ladder L has been engaged by the rung grips 36, 38 the carriage assembly 14 and ladder L therein is preferably rotated from the loading and unloading position shown in FIGS. 1–3 to the stowage position shown in FIGS. 4–7. To perform this task, a user preferably moves the ratchet engagement handle 92 (i.e., pushes the handle in the illustrated preferred embodiment) to engage the ratchet 78 with its pawls 80. The user then swings the ladder rack lever 68 (after unfolding or pivoting the ladder rack handle 68 if such a handle is used) to rotate the pawls 80, rotate the ratchet 78, rotate the pivot 20, and thereby rotate the carriage assembly 14 away from its loading and unloading position. If necessary, multiple swings of the ladder rack lever 68 can be made to rotate the carriage assembly 14 to its stowage position, such multiple swings facilitated by the ratchet assembly 72. To contain the ladder L in the ladder rack 10 during its rotation about the pivot 20, one or more limit members 104 can be attached in any conventional manner or be integral with the carriage 30 and/or the arms 28 as shown in the figures. These limit members 104 are preferably tubes, rods, or posts, but can instead take any other form capable of containing the ladder L, such as one or more walls, bumps, lips, and the like located beside the ladder L.

When in the stowage position shown in FIGS. 4–7, the carriage assembly 14 is preferably located in a position at least partially overlying the ladder L in the rack 10. For this purpose, the arms 28, 44 are preferably shaped to extend from the pivot 20 over the ladder L in the rack 10. The arms 28, 44 can take a number of different shapes to be positioned in this manner, but preferably are curved adjacent to their connection to the pivot 20 as shown in the figures. The position of the ladder L located between the frame assembly 12 and the carriage assembly 14 provides a relatively compact arrangement in which unauthorized removal of the ladder L is prevented by significant ladder rack structure.

To remove the ladder from the rack 10, the above-described steps are preferably performed in reverse. Briefly, the user moves the ratchet engagement handle 92 (i.e., pulls the handle 92 in the illustrated preferred embodiment) to disengage the ratchet 78 from its pawls 80 and to engage the secondary ratchet 94 with its pawl 98. Then, the user grasps and rotates the ladder rack lever 68 to rotate the pivot 20, carriage assembly 14, and ladder L from its stowage position. When the carriage assembly 14 is rotated to a point where gravity pulls the carriage assembly 14 and ladder L to its loading and unloading position, further rotation of the carriage assembly 14 is preferably controlled by the dampers 64 attached to the pivot 20 as described above and/or by the user exerting resistive rotational force upon the ladder rack lever 68 via the secondary ratchet 94 and its pawl 98.

After the pivot 20, carriage assembly 14, and ladder L have rotated to the loading and unloading position shown in FIGS. 1–3, the user can extend the carriage 30 (preferably by releasing the carriage positioning mechanism 46 as described above) until the rung grips 36, 38 are sufficiently far apart to permit removal of the ladder L.

Although preferred embodiments of the present invention employ two rung grips 36, 38 that are movable together to rotate with the ladder L between the loading and unloading and the stowage positions, it should be noted that the opposing rung grip 38 need not necessarily be movable at all, and can instead be mounted to any portion of the frame assembly 12, a pivot bushing 22, directly to the vehicle, or to any other surface that is stationary with respect to the rotating pivot 20 and carriage assembly 14. In such a case, the opposing rung grip 38 is preferably as close to the pivot 20 as possible to help provide controlled ladder movement and to properly position the ladder L in the ladder rack 10 in its various rotational positions. However, other locations of such a stationary rung grip 38 are possible in the present invention. It should also be noted that although only two rung grips 36, 38 are preferably employed in the present invention, more rung grips mounted upon other arms or in any of the other manners described above can also be used to grip the ladder rungs, if desired.

It will be appreciated by one having ordinary skill in the art that the ladder rack of the present invention can be adapted for rotating a ladder from a loading and unloading position to a stowage position through any angle. In the preferred embodiment described above and illustrated in the figures, a ladder L is rotated from a position substantially beside a vehicle, through an obtuse angle, and to a position substantially on top of or over the vehicle. Preferably, the angle through which the carriage 30 and ladder L rotate is at least 135 degrees. More preferably, this angle is at least 180 degrees. Most preferably, this angle is between 200 and 270 degrees. The angle swept by the carriage 30 and the ladder L can be significantly different depending at least in part upon the ladder rack's application and upon the structural environment of the ladder rack 10. Any angle between the ladder rack loading and unloading position and the stowage position is possible in the present invention. For example, when the ladder rack 10 is installed on an automobile, pick-up truck, or other vehicle at a location that is relatively close to the ground, the loading and unloading position can be at a shallower angle than that shown in the figures, such as at a decline of 45 degrees with respect to horizontal or even at a substantially horizontal orientation. The amount of carriage assembly rotation called for in such cases therefore can vary considerably. As another example, the stowage position of the ladder rack 10 can be substantially vertical, such as on the side of a large walled vehicle. The amount of carriage assembly rotation between the loading and unloading position and the stowage position in these cases can therefore be significantly less than the rotation of the carriage assembly 14 in the illustrated preferred embodiment. Still other carriage assembly rotation angles are possible and fall within the spirit and scope of the present invention.

In addition to the different possible angles of carriage assembly and ladder rotation in the present invention, it should be noted that the loading and unloading and the stowage positions can be at any angle desired. For example, either of the loading and unloading and stowage positions can be substantially vertical, substantially horizontal above a portion of the vehicle, substantially horizontal below a portion of the vehicle (such as a stowage position located beneath the bed of a truck), or in any other orientation with respect to the vehicle.

The various elements of the present invention are preferably made of a relatively strong and resilient material such as steel, aluminum, iron, or other metal, plastic, fiberglass, composites, or combinations thereof. However, the materials of the rung grip pad 40 and the bearing elements 34 are more preferably made of material as described above.

As described above, some highly preferred embodiments of the present invention employ an arm, arms, or other member or structure upon which a carriage 30 can be translated to change the distance between the carriage rung grip 36 and the opposing rung grip 38. Although the embodiments described above employ a carriage 30 that is movable upon the arms 28 through a substantially straight path that is preferably substantially tangential to an imaginary circle circumscribed about the opposing rung grip 38 (e.g., substantially perpendicular to the pivot 20 in the illustrated preferred embodiment), the path taken by the carriage 30 can be significantly different.

The arms 28 can be oriented in any other direction desired so that the carriage 30 moves therealong to change the distance between the rung grips 36, 38. For example, the arms 28 or other structure described above upon which the carriage 30 is movable can be oriented at any angle with respect to the pivot 20, such as at an angle where the carriage 30 moves closer to the opposing rung grip 38 when retracted upon the arms 28 or at an angle where the carriage 30 moves away from the opposing rung grip 36 when retracted upon the arms 28. The carriage 30 can even be movable in a radial or substantially radial direction with respect to the second rung grip 38 (e.g., parallel or substantially parallel to the pivot 20 in the illustrated preferred embodiment). These alternative structures illustrate that the ladder rack 10 of the present invention need not necessarily hold a ladder L by gripping rungs located between the rung grips 36, 38. Specifically, the ladder rack 10 can instead or also hold a ladder L by expanding the distance between the rung grips 36, 38 to grip ladder rungs that are outboard (between a rung grip 36, 38 and the end of the ladder) of the rung grips 36, 38. Either manner of engagement is possible in the ladder rack 10 of the present invention. As another example, the arms 28 can be bent, curved, bowed, or otherwise shaped so that the carriage 30 follows a path that is not straight in at least part of the carriage's range of travel on the arms 28. The path followed by the carriage 30 in such cases preferably brings the carriage rung grip 36 closer to the opposing rung grip 38 when the carriage 30 is retracted on the arms 28 and brings the carriage rung grip 36 away from the opposing rung grip 38 when the carriage 30 is extended on the arms 28. As noted above however, the opposite can be the case where the rung grips 36, 38 expand to grip a ladder in the ladder rack 10.

As described above, a number of alternative devices and structure can be used to move the carriage rung grip 36 with respect to the opposing rung grip 38. Like the preferred carriage and arm structure, the alternative devices and structure can be adapted to move the first rung grip 36 in other manners with respect to the second rung grip 38 to change the distance therebetween. Regardless of whether a track, rail, telescoping tubes, pin or tongue and groove, or other structural relationship exists between the carriage 30 (or first rung grip 36) and the element or elements to which the carriage 30 is movably connected, any such structure can be oriented at any angle with respect to the second pivot 38 or can be shaped to pass the carriage 30 (or first rung grip 36) through a path that is not straight as just described. For example, where telescoping tubes are used in place of the arms 28 and carriage 30 as described above, the tubes can be oriented at any angle with respect to the second rung grip 38. As another example, where the carriage 30 or first rung grip 36 is mounted in or on a track or rail for movement with respect to the second rung grip, the track or rail can be curved, bowed or bent to guide the first rung grip 36 through a path that is not straight. In such alternative embodiments of the present invention, the rung grips 36, 38 can be brought closer together or farther apart to grip the ladder as described above.

In yet another embodiment of the present invention representing an alternative to the carriage assembly 14 of the present invention described above and illustrated in the figures, the first rung grip 36 can be movable with respect to the second rung grip 38 by being mounted upon or integral with an element pivotably mounted with respect to the second rung grip 38. For example, a pivot arm can be pivotably mounted to the frame assembly 12, pivot 20, shroud 102, or other portion of the ladder rack 10 and can have the first rung grip 36 mounted thereto, integral therewith, or otherwise extending therefrom. By pivoting the pivot arm, the first rung grip 36 can rotate toward and away from the second rung grip 38, thereby changing the distance between the rung grips 36, 38 to grip the ladder L by its rungs.

With reference to the above alternatives to straight translation of a carriage 30 upon arms 28 to grip the ladder L, one having ordinary skill in the art will appreciate that any structure or element mounted for translational or rotational movement with respect to the opposing rung grip 38 and upon which the first rung grip 36 is located can be used for changing the distance between the rung grips 36, 38, whether this distance is increased or decreased to grip the ladder L in the rack. Any of the embodiments described above can even be adapted for a combination of translational and rotational motion, if desired, such as mounting part or all of each arm 28 in the illustrated preferred embodiment for rotational movement with respect to the opposing rung grip 38. One having ordinary skill in the art will also appreciate that, although not preferred, the ladder rack 10 can be adapted for engagement of the ladder L when the carriage 30 of the illustrated preferred embodiment is extended upon the arms 28 and for release when the carriage 30 is retracted upon the arms 28. For example, the rung grips 36, 38 in the illustrated preferred embodiment can be spaced so that when the ladder L is loaded upon the rung grips 36, 38 in the retracted position of the carriage 30 shown in FIG. 3, extension of the carriage 30 along the arms 28 causes expansion of the rung grips 36, 38 to grip adjacent outboard ladder rungs. In a similar manner, any of the above-noted alternative embodiments for the carriage assembly 14 can be adapted for ladder engagement when extended and ladder release when retracted.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims. For example, although a frame assembly 12 having frame beams 18 mounted to the vehicle in a conventional manner is preferred, any type of conventional frame assembly capable of supporting the pivot 20, rotating assembly 16, and carriage assembly 14 can be used. Also, the manner of attachment of the ladder rack 10 is also not limited to the flanged ends 26 of the bushings 22 described above and illustrated in the figures. Any other manner of directly or indirectly mounting the pivot 20 for rotation with respect to the mounted surface, body, or vehicle is possible and within the spirit and scope of the present invention. In this regard, it is even possible to mount the ladder rack 10 of the present invention directly to a mounted surface, body, or vehicle without a frame assembly 12. For example, the flanged ends 26 of bushings 22 can be fastened or attached in any conventional manner directly to structural elements of the mounted surface, body, or vehicle, if desired.

Also, the ladder rack 10 of the present invention can be used to hold and secure a ladder L without rotating the pivot 20, carriage assembly 14, or ladder L. Specifically, a stowage position that is the same as the retracted and gripped position of the ladder rack described above is possible. In such embodiments, the arms 28 and carriage 30 can be mounted to or otherwise extend from the frame assembly 12, the structure upon which the rack 10 is mounted, and the like. Alternatively, it should be noted that rotation of the pivot 20, carriage assembly 14, or ladder L between a loading and unloading position and a stowage position as described above and illustrated in the figures can be performed without gripping the ladder via the rungs as also described above. In such embodiments, the rung grips need not be movable with respect to one another, in which case the carriage assembly 14 (or other structure used for changing the distance between the rung grips) can be eliminated from the ladder rack 10.

What is claimed is:

1. A ladder rack for securing a ladder having a plurality of rungs and at least two opposing side rails, the ladder rack comprising:

a frame;

an arm pivotably coupled to the frame;

a carriage mounted upon the arm;

a first rung grip coupled to the carriage; and a second rung grip coupled to the frame a distance from the first rung grip for receiving at least two rungs between the first and second rung grips, the carriage mounted on the arm for movement between a first position in which the first and second rung grips grip the ladder via adjacent respective rungs and a second position in which the first and second rung grips are spaced sufficiently to permit substantially unobstructed loading and unloading of the ladder on the ladder rack.

2. The ladder rack as claimed in claim 1, wherein the carriage is mounted for translational movement with respect to the arm.

3. The ladder rack as claimed in claim 1, wherein the arm has at least two rails upon which the carriage is mounted for movement therealong.

4. The ladder rack as claimed in claim 1, further comprising at least one spring coupled to the carriage and to at least one of the carriage and the arm, the at least one spring coupled to bias the carriage into a retracted position on the arm.

5. The ladder rack as claimed in claim 1, wherein the carriage is movable along the arm to change the distance between the first and second rung grips.

6. The ladder rack as claimed in claim 1, wherein the ladder is pivotable about the second rung grip in response to motion of the carriage upon the arm.

7. The ladder rack as claimed in claim 1, further comprising:

a pivot about which the arm is pivotable;

a ratchet coupled to the pivot; and a user manipulatable handle coupled to the ratchet, the handle movable to raise and retain the arm in a raised position via rotation of the ratchet.

8. The ladder rack as claimed in claim 1, further comprising a user manipulatable handle coupled to the arm for rotation thereof by a user, the arm jointed to permit folding of the arm for storage.

9. The ladder rack as claimed in claim 1, wherein the second rung grip is pivotably coupled to the frame for pivotal movement with the arm.

10. The ladder rack as claimed in claim 9, further comprising a pivot to which the second rung grip and the arm are coupled for substantially simultaneous rotation thereabout.

11. The ladder rack as claimed in claim 1, further including an engagement element releasably engagable with the arm to immobilize movement of the carriage along the arm in at least one direction, the engagement element releasably engagable in a plurality of positions along the arm corresponding to a plurality of carriage locations on the arm.

12. The ladder rack as claimed in claim 11, wherein the engagement element is a pin releasably engagable within a plurality of apertures in the arm.

13. The ladder rack as claimed in claim 11, further comprising a handle coupled to the engagement element and manipulatable by a user to disengage the engagement element from the arm.

14. The ladder rack as claimed in claim 1, wherein the arm and carriage are pivotable with respect to the frame from a stowage position through an obtuse angle to a loading and unloading position.

15. The ladder rack as claimed in claim 14, wherein the second rung grip is pivotable with the arm and carriage from the stowage position to a loading and unloading position.

16. The ladder rack as claimed in claim 14, wherein the obtuse angle is at least 135 degrees.

17. The ladder rack as claimed in claim 14, wherein the obtuse angle is at least 180 degrees.

18. The ladder rack as claimed in claim 14, wherein the obtuse angle is between 200 and 270 degrees.

19. The ladder rack as claimed in claim 14, wherein the carriage substantially overlies the ladder in the stowage position.

20. A method of securing a ladder having a plurality of rungs and at least two opposing side rails on a ladder rack, comprising:
 placing a first portion of the ladder on a first rung grip with the first rung grip located adjacent to a first rung of the ladder;
 placing a second portion of the ladder on a second rung grip with the second rung grip located adjacent to a second rung of the ladder, the second rung grip coupled to a movable carriage on the ladder rack;
 moving the carriage with respect to the first rung grip to bring the second rung grip closer to the first rung grip; and
 gripping the first and second ladder rungs between the first and second rung grips to secure the ladder on the ladder rack.

21. The method as claimed in claim 20, wherein moving the carriage includes translating the carriage.

22. The method as claimed in claim 20, wherein movement of the carriage shortens a distance between the first and second rung grips to grip the first and second ladder rungs.

23. The method as claimed in claim 20, wherein moving the carriage includes sliding the carriage upon an pivotably mounted arm.

24. The method as claimed in claim 20, further comprising rotating the first rung grip and the ladder from a load and unload position to a stowage position.

25. The method as claimed in claim 20, wherein the carriage is moved in a first direction, the method further comprising releasably restraining the carriage from movement in a direction opposite the first direction.

26. The method as claimed in claim 20, wherein the carriage is moved in a first direction, the method further comprising exerting a bias force upon the carriage substantially in the first direction.

27. The method as claimed in claim 20, further comprising pivoting the ladder substantially about the first rung grip while sliding the slidable carriage.

28. The method as claimed in claim 27, wherein the ladder is pivotable substantially about the first rung grip through a range of between 200 and 270 degrees.

29. The method as claimed in claim 20, further comprising rotating the ladder and carriage from a load and unload position to a stowage position.

30. The method as claimed in claim 29, further comprising rotating the first rung grip from the load and unload position to a stowage position.

31. The method as claimed in claim 29, further comprising rotating a pivot coupled to the carriage via a ratchet to raise the carriage from the load and unload position to the stowage position.

32. The method as claimed in claim 29, wherein rotating the ladder and carriage includes rotating the carriage to a position overlying the ladder in the stowage position.

33. The method as claimed in claim 29, wherein the ladder and carriage are rotated through an obtuse angle.

34. The method as claimed in claim 33, wherein the obtuse angle is greater than about 135 degrees.

35. The method as claimed in claim 33, wherein the obtuse angle is greater than about 180 degrees.

36. The method as claimed in claim 33, wherein the obtuse angle is between 200 and 270 degrees.

37. A ladder rack for a vehicle having a roof, comprising:
 a ladder pivot;
 an arm coupled for rotation about the ladder pivot;
 a carriage coupled to the arm for sliding movement therealong;
 a first rung grip coupled to the carriage;
 a second rung grip located a distance from the first rung grip, the distance variable to compress at least two rungs of the ladder between the rung grips by sliding the carriage along the arm;
 the arm and the carriage pivotable via the ladder pivot from a stowed position substantially above the roof of the vehicle through an obtuse angle to a loading and unloading position substantially beside the vehicle.

38. The ladder rack as claimed in claim 37, further comprising at least one spring coupled to the carriage to bias the carriage toward the ladder pivot.

39. The ladder rack as claimed in claim 37, wherein the second rung grip is coupled to the ladder pivot for rotation about the ladder pivot.

40. The ladder rack as claimed in claim 37, wherein the carriage is movable through a range of positions corresponding to a range of distances between the first and second rung grips.

41. The ladder rack as claimed in claim 37, wherein the obtuse angle is greater than 135 degrees.

42. The ladder rack as claimed in claim 37, wherein the obtuse angle is greater than 180 degrees.

43. The ladder rack as claimed in claim 37, wherein the obtuse angle is between 200 and 270 degrees.

44. The ladder rack as claimed in claim 37, wherein the carriage substantially overlies the ladder when in the stowed position.

45. The ladder rack as claimed in claim 37, further comprising an engagement element releasably engagable with the arm to immobilize sliding movement of the carriage along the arm in at least one direction, the engagement element releasably engagable in a plurality of positions along the arm corresponding to a plurality of carriage locations on the arm.

46. The ladder rack as claimed in claim 37, further comprising a ratchet coupled to the ladder pivot providing incremental rotationally supported movement of the pivot in at least one direction.

47. A method for loading a ladder upon a vehicle, comprising:
 loading a first portion of the ladder upon a carriage, the carriage being located substantially between the vehicle and the ladder;
 loading a second portion of the ladder upon a rung grip; and rotating the carriage from a first position substantially beside the vehicle through an obtuse angle to a second position substantially on top of the vehicle, the ladder in the second position being located substantially between the carriage and the vehicle.

48. The method as claimed in claim 47, wherein the rung grip is a first rung grip and wherein loading a first portion of the ladder includes loading the ladder upon a second rung grip located a distance from the first rung grip.

49. The method as claimed in claim 47, further comprising rotating the first grip with the carriage.

50. The method as claimed in claim 47, wherein the obtuse angle is at least 135 degrees.

51. The method as claimed in claim 47, wherein the obtuse angle is at least 180 degrees.

52. The method as claimed in claim 47, wherein the rung grip is a first rung grip, the method further comprising pivoting the ladder about a second rung grip while sliding the carriage upon the arm.

53. The method as claimed in claim 47, further comprising sliding the carriage upon an arm pivotably mounted with respect to the vehicle.

54. The method as claimed in claim 53, wherein the rung grip is a first rung grip, the method further comprising changing a distance between the first rung grip and a second rung grip to compress rungs of the ladder between the first rung grip and the second rung grip.

* * * * *